UNITED STATES PATENT OFFICE.

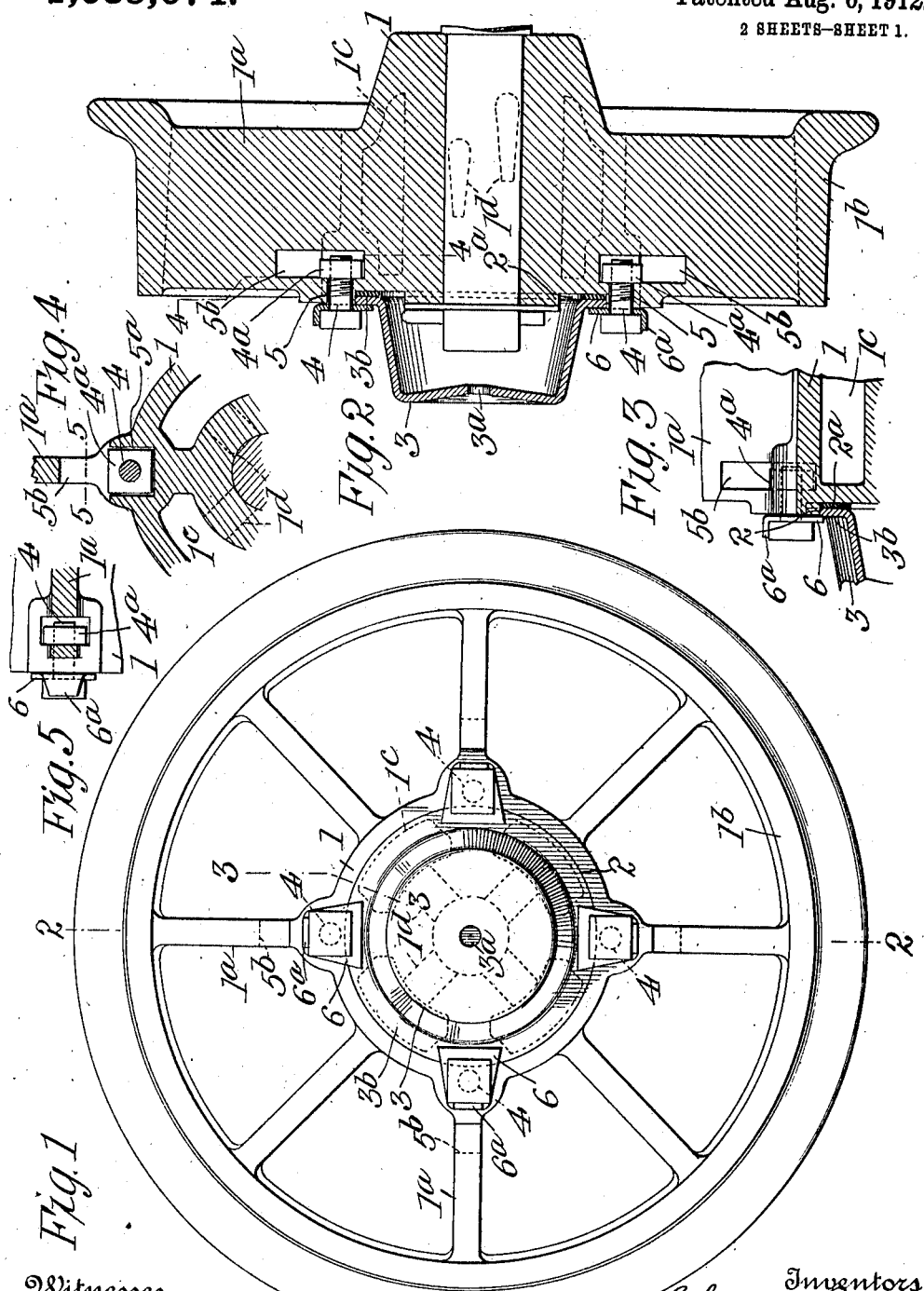

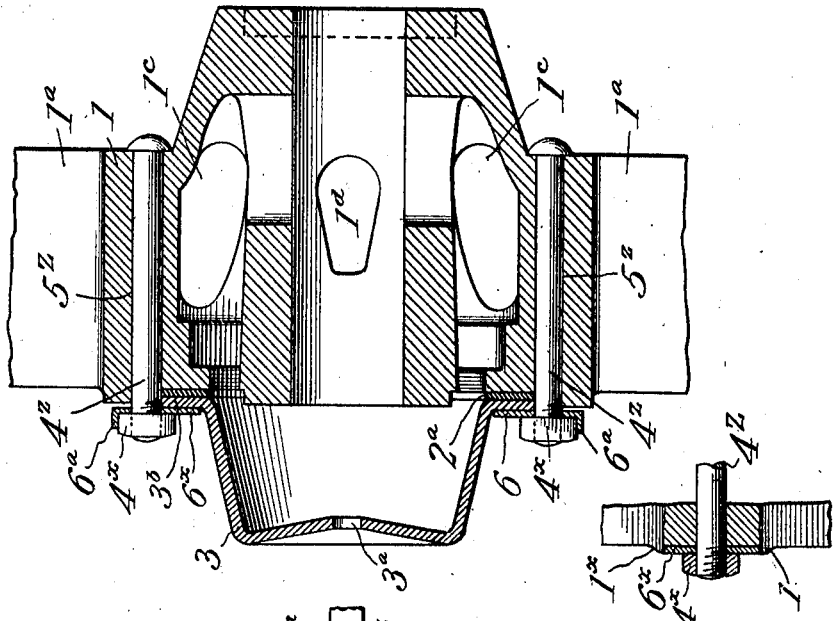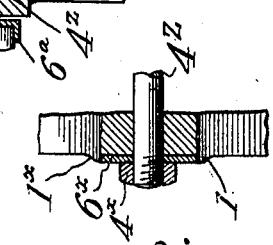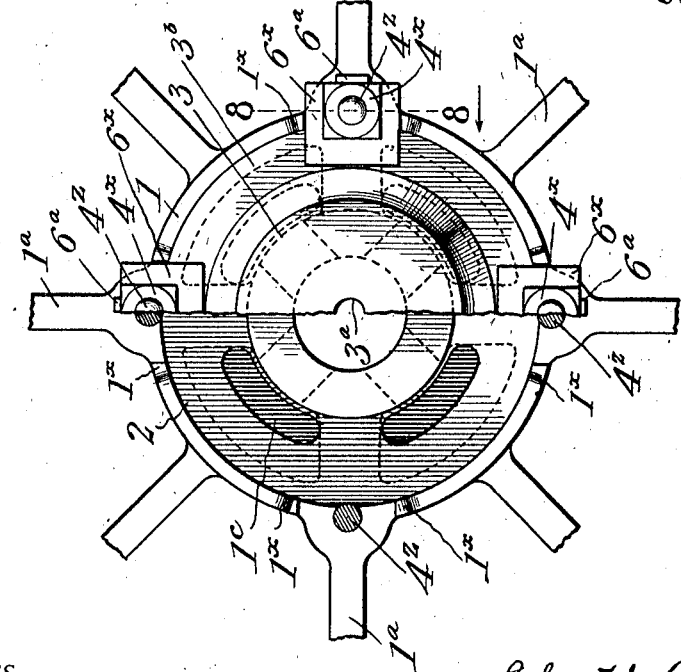

JOHN W. BAKER, WILBER O. BLOWERS, AND WILLIAM H. BINES, OF BARNESVILLE, OHIO, ASSIGNORS TO THE WATT MINING CAR WHEEL COMPANY, OF BARNESVILLE, OHIO, A CORPORATION OF OHIO.

SELF-OILING CAR-WHEEL.

1,035,074. Specification of Letters Patent. Patented Aug. 6, 1912.

Application filed June 3, 1912. Serial No. 701,356.

*To all whom it may concern:*

Be it known that we, JOHN W. BAKER, WILBER O. BLOWERS, and WILLIAM H. BINES, each of Barnesville, in the county of Belmont and State of Ohio, have invented certain new and useful Improvements in Self-Oiling Car-Wheels; and we hereby declare that the following is a full, clear, and exact description thereof, reference being had to the accompanying drawings, which form part of this specification.

This invention is an improvement in self-oiling car wheels, and has particular reference to the means for securing the cap which covers the outer end of the hub and axle to the wheel.

The invention consists essentially in forming the wheel on its outer face with a shallow annular recess concentric to the axis; and providing a removable cap, preferably made of pressed steel, having a circular flange on its base adapted to fit within the annular recess in the face of the wheel, said cap being secured in such recess by bolts which pass through suitable holes in the hub of the wheel, adjacent the recess, and are fastened by nuts and locking washers so when the bolts are tightened the flange of the cap fitting in the recess in the wheel prevents lateral displacement of the cap, and the bolts and washers prevent separation of the cap from the wheel.

We will describe the invention more in detail with reference to the accompanying drawings in which:

Figure 1 is a face view of a wheel with the cap in position thereon. Fig. 2 is a vertical section on line 2—2, Fig. 1. Fig. 3 is a detail section on line 3—3, Fig. 1. Fig. 4 is a detail section on line 4—4, Fig. 2. Fig. 5 is a detail section on line 5—5, Fig. 4. Fig. 6 is a part section and part end elevation of a modification of the construction. Fig. 7 is a central vertical section through Fig. 6. Fig. 8 is a detail section on line 8—8, Fig. 6.

The wheel proper may be of any desired construction. We have shown in the drawings an ordinary mine car wheel having a hub portion 1, spokes $1^a$ and a flanged tread $1^b$. The hub 1 is preferably provided with oil chambers $1^c$ which communicate with the bore of the hub through apertures or passages $1^d$. In the outer face of the wheel concentric with the axis thereof is a shallow annular recess 2, and covering this recess and the outer end of the wheel and axle (when the wheel is in position on the axle) is a cap 3, which is preferably made of pressed steel and will protect the outer end of the axle and the pin which secures the wheel on the axle as indicated in Fig. 2. The cap 3 may have a central aperture $3^a$ in its outer end, for the admission of oil, and has an annular base flange $3^b$ which practically corresponds in diameter with the diameter of the recess 2 and is adapted to be fitted therein, as indicated in the drawings. A gasket or washer $2^a$ of any suitable material—preferably rubber—may be interposed between the flange $3^b$ and the base of the recess. The cap 3 is practically kept in position against lateral or eccentric displacement relatively to the wheel hub by the engagement of the outer edge of its flange $3^b$ with the outer wall of the recess 2.

As shown in Figs. 1 to 5 the cap is fastened to the wheel by means of bolts 4 which pass through holes 5 in the outer end of the hub, or at the base of the spokes, as indicated in the drawings. The threaded inner ends of the bolts 4 engage nuts $4^a$ which are removably confined in pockets $5^a$ formed in the wheel hub or in the base of the spokes connected to the hub adjacent the holes 5.

As shown in Figs. 1 to 5 the pockets $5^a$ are preferably made in the hub of the wheel at the base of alternate spokes; and such spokes have lateral slots $5^b$ in them adjacent to and connecting with the pockets $5^a$, through which slots the nuts $4^a$ can be introduced into the pockets $5^a$, as indicated in the drawings. The pockets $5^a$ effectually prevents the nuts turning on the bolts. The holes 5 are preferably located so close to the edge of the recess 2 that when the bolts 4 are placed in position and tightened by engagement with the nuts, the heads of the bolts project over the edge of the flange $3^b$ of the cap, see Figs. 1 and 2, and securely fasten the latter to and against the face of the wheel clamping the flange of the cap in the recess 2 and tightly against the washer $2^a$. To prevent the bolts 4 loosening, plate metal washers 6 are preferably strung on the bolts, between the bolt heads and the flange $3^b$, and after the bolts have been tightened the outer ends of these washers are bent over against the outer sides of the bolt heads as shown at 6ª; thereby preventing the bolts turning, and at the same time the bodies of the washer afford an enlarged bearing or clamping surface between the bolt head and the flange 3ᵇ.

As shown in Figs. 6 and 7 in place of the short bolts 4 shown in Figs. 2 and 3, the bolt holes extend entirely through the hub as shown at 5ᶻ and long bolts 4ᶻ are used, the heads of which bolts preferably come at the rear of the wheel and their outer ends are nutted as shown at 4ˣ. The washers 6ˣ are strung on the outer end of the bolts between the nuts 4ˣ and the flange of the cap 3, and the nuts preferably 4ˣ overlap the edge of the flange, similarly to the heads of the bolts in Figs. 1 and 2, and washers 6ˣ are turned down over the nuts to lock the latter, as indicated at 6ª. In this construction the face of the wheel adjacent the edge of the recess 2 and the bolt holes 4 may be provided with lugs 1ˣ as shown in Figs. 6 and 8, which prevent lateral displacement of the washers 6ˣ.

While we prefer the construction shown in Figs. 1 to 5, the through bolts might be used as shown in Figs. 6 to 8, while retaining the advantages of the movable cap secured by the overlapping bolt heads or nuts and the locking washers.

With this invention the cap is securely held in position on the wheel and will not become loose, and will retain the oil in the cap and chambers of the hub without leakage. The nuts cannot work loose in the pockets 5ª, and the bolts cannot work loose because of their locking washers 6. The flange of the cap fitting in the recess in the face of the wheel is protected by the face of the wheel, and the cap is so securely held that it will not be affected by blows on its projecting portion.

What we claim as new is:

1. In combination, a wheel hub having an annular recess in its outer face, and bolt openings adjacent the edges of the recess; a cap having a flange adapted to fit within the recess, bolts passing through the said openings, and bolt locking devices strung on the bolts and engaging the cap flange, substantially as described.

2. In combination, a wheel having an annular recess in its outer face concentric with the hub, and bolt openings adjacent the outer edge of the recess; a cap having an annular flange on its base adapted to fit within the recess; bolts engaging said openings, and locking washers strung on said bolts and engaging the flange to lock the bolts and assist in securing the cap in place.

3. In combination, a wheel having bolt openings adjacent the axis, and pockets at the inner ends of the bolt openings for the reception of nuts, a cap having an annular flange, and bolts passed through said openings and engaging nuts in the pockets the heads of the bolts lapping the flange of the cap, and securing the cap to the wheel.

4. In combination, a wheel having an annular recess in its outer face, bolt openings adjacent the said recess, and pockets at the inner ends of the bolt openings for the reception of nuts, a cap having an annular flange adapted to engage the recess, and bolts passing through said openings and engaging nuts in the pockets the heads of the bolts lapping the flange of the cap.

5. In combination with a car wheel having a cylindric recess concentric with its hub, bolt holes in the wheel adjacent the edge of the recess, and nut holding pockets at the inner end of the bolt holes; a cap having a flange engaging the recess, and bolts having their outer ends engaging the flange, the flange of the cap and their inner ends engaging the nuts secured in said pockets.

6. In combination a wheel having an annular recess in its outer face, bolt openings adjacent the said recess, and pockets at the inner ends of the bolt openings for the reception of nuts; a cap having an annular flange adapted to engage the recess, bolts passing through said openings and engaging nuts in the pockets, the heads of the bolts lapping the flange of the cap, a washer in the recess between the cap flange and wheel, and bolt locking washers between the heads of the bolts and the flange, substantially as described.

In testimony that we claim the foregoing as our own, we affix our signatures in presence of two witnesses.

JOHN W. BAKER.
WILBER O. BLOWERS.
WILLIAM H. BINES.

In presence of—
W. F. SMITH,
C. J. HOWARD.

---

Copies of this patent may be obtained for five cents each, by addressing the "Commissioner of Patents, Washington, D. C."